United States Patent
Schedler et al.

(10) Patent No.: US 7,128,980 B2
(45) Date of Patent: Oct. 31, 2006

(54) COMPOSITE COMPONENT FOR FUSION REACTORS

(75) Inventors: Bertram Schedler, Reutte (AT);
Thomas Granzer, Haldenwang (DE);
Thomas Huber, Lechaschau (AT);
Karlheinz Scheiber, Breitenwang (AT);
Dietmar Schedle, Reutte (AT);
Hans-Dieter Friedle, Häselgehr (AT);
Thomas Friedrich, Halblech (DE);
Anton Zabernig, Reutte (AT)

(73) Assignee: Plansee SE, Reutte (AT)

( * ) Notice: Subject to any disclaimer, the term of this patent is extended or adjusted under 35 U.S.C. 154(b) by 252 days.

(21) Appl. No.: 10/814,311

(22) Filed: Mar. 30, 2004

(65) Prior Publication Data

US 2004/0195296 A1  Oct. 7, 2004

(30) Foreign Application Priority Data

Apr. 2, 2003  (AT) ........................... GM 228/2003

(51) Int. Cl.
*B32B 15/00* (2006.01)
*B23K 103/08* (2006.01)
*G21C 11/08* (2006.01)

(52) U.S. Cl. ............... 428/553; 428/665; 428/674; 228/182; 228/220; 228/221; 228/262.7; 376/906

(58) Field of Classification Search ............... None
See application file for complete search history.

(56) References Cited

U.S. PATENT DOCUMENTS

| 5,126,102 A | * | 6/1992 | Takahashi et al. ............. 419/2 |
| 5,126,106 A |   | 6/1992 | Hidaka et al. |
| 5,988,488 A |   | 11/1999 | Slattery et al. |
| 6,089,444 A | * | 7/2000 | Slattery et al. ............. 228/194 |
| 6,271,585 B1 | * | 8/2001 | Osada et al. ................. 257/712 |
| 6,443,354 B1 |   | 9/2002 | Plöchl et al. |

FOREIGN PATENT DOCUMENTS

| EP | 1 025 938 A1 | 8/2000 |
| JP | 05-256968 | 10/1993 |
| JP | 09-241705 | 9/1997 |
| JP | 11-190787 | 7/1999 |

* cited by examiner

*Primary Examiner*—John J. Zimmerman
(74) *Attorney, Agent, or Firm*—Laurence A. Greenberg; Werner H. Stemer; Ralph E. Locher

(57) ABSTRACT

A highly heat-resistant laminated component for a fusion reactor has at least of a plasma-facing area made of tungsten or a tungsten alloy, a heat-dissipating area of copper or a copper alloy with a mean grain size of more than 100 μm, and an interlayer of a refractory metal-copper-composite. The refractory metal-copper-composite has a macroscopically uniform copper and refractory-metal concentration progression and a refractory metal concentration of between 10 vol. % and 40 vol. % over its entire thickness.

26 Claims, 1 Drawing Sheet

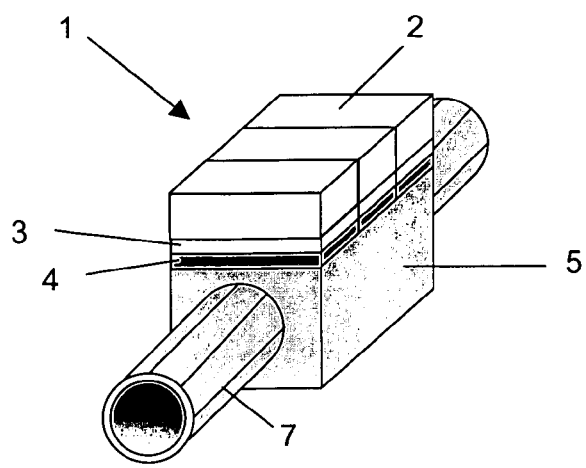
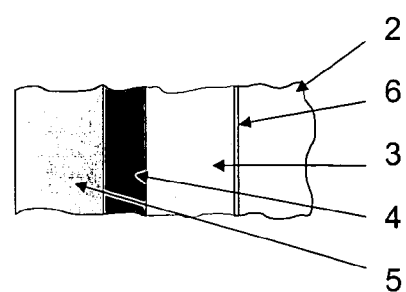
Fig. 1
Fig. 2
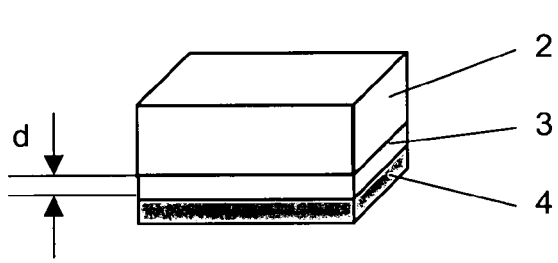
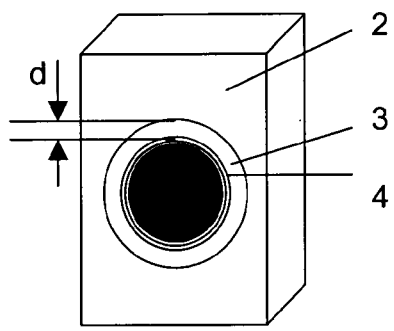
Fig. 3
Fig. 5
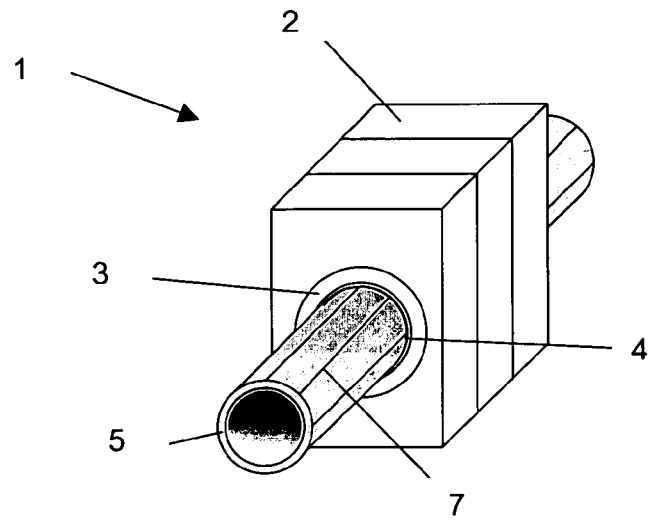
Fig. 4

COMPOSITE COMPONENT FOR FUSION REACTORS

BACKGROUND OF THE INVENTION

Field of the Invention

The invention relates to a highly heat-resistant laminated component for a fusion reactor. The component has at least one plasma-facing area made of tungsten or a tungsten alloy with a tungsten concentration of >90% by weight, a heat-dissipating area made of copper or a copper alloy with conductivity of >250 W/mK and a mean grain size of >100 μm, and an area lying in between and being formed of a refractory-metal-copper composite.

For stationary fusion reactor operation, power flows of up to 10 MW/m$^2$ can be expected in the area of the surface of first-wall components, which are also referred to as PFCs (plasma facing components). In the event of plasma breakdown, approximately 20 GJ may be released at certain points within only a few milliseconds. The development of PFCs designed specifically for use in areas of maximum energy concentration, such as diverter, baffle and limiter areas, represents a key element in the technological implementation of the results of fusion research.

The material requirements applicable to PFC components are diverse and often conflict with one another. In addition to physical and mechanical properties such as high thermal conductivity, high melting point, low vapor pressure, good thermal-shock resistance and suitability for processing, use in nuclear fusion poses special requirements, including low activation and transmutation under heavy neutron exposure, low continuous tritium absorption, low erosion by plasma ions and neutron particles, low sputter rate and erosion resulting from local effects such as arcs and hotspots as well as low cooling of core plasma through characteristic radiation.

Depending upon the specific load conditions, the preferred materials for PFCs are beryllium, carbon-fiber-reinforced carbon (CFC), and tungsten. Tungsten is particularly well suited for use in the first wall, where relatively low plasma temperatures and high particle densities prevail. Tungsten has very good thermal properties such as high thermal conductivity (165 W/mK at room temperature). Moreover, its high melting point, low tritium absorption capacity, low vacuum gas rate and low sputter rate virtually predestine tungsten for use in PFCs. In order to achieve effective heat removal in areas of extreme energy density, PFCs must be actively cooled. This can be accomplished with the aid of copper components filled with circulating coolant, which are combined as a heat sink with the tungsten components. To achieve sufficiently high mechanical stability and rigidity, it is advantageous to join the copper heat sink with a highly rigid metallic structural material. Austenitic steels and particle-reinforced copper alloys, such as age-hardened Cr—Zr alloyed copper alloys (Cu—Cr—Zr) or ODS (oxide-dispersion-strengthened) copper materials (e.g. Cu—Al$_2$O$_3$, Cu—ZrO$_2$, Cu—Y$_2$O$_3$, Cu-rare-earth-oxide) are suitable for reinforcing elements of this kind. Two design variations are considered for PFCs to be used in areas of high energy density. In so-called flat tiles, the transitions between the individual materials are nearly uniform. In monoblock components, sufficient structural stability and rigidity are provided by the tube filled with circulating coolant, which may consist, for example, of an age-hardened copper alloy or ODS copper. Toward the outside, the other materials are arranged in a configuration comparable to that of the flat-tile variation. The tungsten segment is a cube-shaped body that surrounds the cooling tube, whereby a buffer layer consisting of a soft, ductile materials, preferably pure copper with a low oxygen content (OFHC copper) is placed between the cooling tube and the tungsten segment.

A particular difficulty encountered in the production of laminated parts for fusion reactors, such as flat-tile or monoblock components, is that tungsten and copper exhibit very different heat expansion behavior. The heat expansion coefficient of tungsten at room temperature is $4.5 \times 10^{-6}$ K$^{-1}$, while that of copper is $16.6 \times 10^{-6}$ K$^{-1}$.

Technologies recommended for bonding tungsten to copper include diffusion welding and back-casting. Diffusion welding can be performed using hot isostatic pressing (HIP) as described in European patent specification EP 1 025 938. The processes cited above are performed within a temperature range of approximately 700 to 1300° C.

During cooling, stress builds up in the vicinity of the joint as a result of the different heat expansion coefficients of tungsten and copper. Stresses are also induced when PFCs are used, however, as they are exposed to cyclical heat loads. These stresses can cause cracking or separation at the tungsten to copper interfaces. This hinders thermal dissipation and thus poses the danger that the laminated component will melt. Extensive development programs have been initiated, some of which have already been completed, for the purpose of realizing a laminated component consisting of a plasma-facing tungsten segment bonded form-fitting with an actively cooled copper heat sink which exhibits low bonding stresses in the interface area.

A significant reduction in stresses was achieved by designing the tungsten segment as a group of individual small cubes or rods with side lengths or a diameter of several millimeters, whereby the cubes or rods are inserted into a copper segment. This form of segmentation reduces thermal stresses resulting from the bonding process and from cyclical operation. However, the design also poses a high risk of fatigue cracking in the tungsten-copper interface.

Numerous attempts have been made to reduce tensions in the interface by incorporating a graded interlayer between the tungsten and copper segments.

Thus, U.S. Pat. No. 5,126,102, for example, describes a method for producing a tungsten-copper FGM (functionally graded material) in which a tungsten segment with graded porosity, produced by thermal plasma spraying, for example, is infiltrated with copper.

U.S. Pat. No. 5,988,488 also describes a production process in which thermal plasma spraying is used to achieve a graded interlayer between the tungsten and copper segments. In contrast to the process described in U.S. Pat. No. 5,126,102, the copper phase is also separated by thermal plasma spraying, whereby the specific powder blend added contains corresponding proportions of tungsten and copper. A thin metallic film between the tungsten and the FGM promotes adhesion.

U.S. Pat. No. 5,988,488 also contains a description of an attempt to insert a layer consisting of a blend of copper and tungsten between the tungsten and the copper heat sink by brazing or diffusion bonding. However, the difference in the heat expansion coefficients was too great. No further detailed explanations are provided in this patent.

It can be assumed that the production processes described in both, U.S. Pat. No. 5,126,102 and U.S. Pat. No. 5,988,488 produce laminated parts that exhibit significantly higher resistance to thermally induced cracks. However, the disadvantage of the processes described in these patents is that they are complicated and, consequently, the parts produced in the manner described are very expensive. Moreover, due to process engineering constraints, the technologies cited above are applicable to flat-tile structures only. Generally speaking, their use in the production of monoblock geometries is impossible for geometric reasons.

SUMMARY OF THE INVENTION

It is accordingly an object of the invention to provide a laminated component for a fusion reactor which overcomes the above-mentioned disadvantages of the heretofore-known devices and methods of this general type and which provides for laminated components for fusion reactors consisting at least in part of tungsten or a tungsten alloy and copper or a copper alloy which exhibit sufficient functional capacities, particularly with respect to thermal fatigue, which can be produced cost-effectively, and which are suitable for monoblock geometries.

With the foregoing and other objects in view there is provided, in accordance with the invention, a highly heat-resistant laminated component for a fusion reactor, comprising:

a plasma-facing area made of tungsten or a tungsten alloy with a tungsten concentration of >90% by weight, a heat-dissipating area of copper or a copper alloy with a thermal conductivity of >250 W/mK and a mean grain size of >100 μm, and an area in between the plasma-facing area and the heat-dissipating area of a refractory-metal-copper composite;

the refractory-metal-copper composite having a macroscopically uniform copper and tungsten concentration progression and a refractory metal concentration x of 10 vol. %<x<40 vol. % throughout a thickness d of 0.1 mm<d<4 mm, and a refractory metal phase forming a virtually continuous skeleton.

Refractory-metal-copper components are used in many industrial applications as heat sinks or heat spreaders, in electronic packages, for example. Refractory metals are elements in groups $IV^b$ and $V^b$ of the periodic table of elements which have a melting point above 1800° C.—specifically the metals Nb, Ta, Cr, Mo, and W.

Contrary to the widespread conception that stresses in tungsten-copper laminated components for fusion reactors can be reduced only with the use of FGMs, experiments surprisingly showed that interlayers composed of refractory-metal-copper materials with a macroscopically uniform copper-refractory-metal concentration progression can also be used effectively. A macroscopically uniform concentration progress is defined as the concentration progression throughout the thickness of the refractory-metal-copper composite without regard for microscopic differences in concentration. Microscopic differences in concentration always appear in refractory-metal-copper composites, since refractory metals and copper are insoluble or soluble only to a small extent in each other. Thus one finds copper and refractory-metal phase areas next to one another in sizes of between 5 and 50 μm.

An effective reduction of stresses in the interface area is can only be achieved if the layer consisting of a refractory-metal-copper composite is at least 0.1 mm thick. Thinner layers do not provide for sufficient tension reduction. While thicknesses of 4 mm and above do not impair the functional capacity of the laminated part in terms of resistance to separation and thermally induced fatigue cracking, heat dissipation is reduced by virtue of the poorer thermal conductivity of the refractory-metal-copper composite to the extent that the functional reliability of the laminated part is not longer ensured.

A further prerequisite for sufficient functional capacity is that the refractory metal concentration in refractory-metal-copper composites must lie between 10 and 40% by volume. Process reliability is not sufficiently ensured at either higher or lower refractory metal concentrations. Furthermore, the refractory-metal-copper composite must be produced in such a way that the refractory-metal phases form a nearly continuous skeleton.

This requirement is met by refractory-metal-copper composites produced using power-metallurgical processes, such as the infiltration of a porous refractory-metal body with copper. The porous refractory-metal body can be a shaped or sintered object. Refractory-metal-copper composites with nearly continuous skeletons can also be produced by pressing powder mixtures or composite powders and sintering. Aside from W—Cu and Mo—Cu composites produced in this way, the use of rolled or extruded Mo—Cu composites has proven to be particularly advantageous. Furthermore, the copper or copper-alloy segment must be capable of sufficiently reducing thermally induced stresses. Given the selection criterion of "thermal conductivity >250 W/mK", only copper materials with a low concentration of alloy elements and a correspondingly low yield strength can be used. In addition, the copper or copper-alloy segment must have a mean particle size of more than 100 μm in order to ensure effective stress reduction. The bonding of the copper or copper-alloy segment using OFHC (oxygen-free-high-conductivity) copper by back-casting it to the refractory-metal-copper composite has proven highly advantageous. This process ensures that the mean particle size in the copper/copper-alloy segment is always greater than 100 μm. The bonding of the tungsten/tungsten-alloy segment with the refractory-metal-copper composite segment by melting the copper phase can be accomplished during the same process phase. It has proven advantageous to introduce a copper foil or sheet with measuring between 0.005 and 0.5 mm in thickness between the tungsten and the refractory-metal-copper composite. In order to improve the bond between tungsten and copper, it is also advantageous to introduce a metallic element or alloy—by coating the tungsten substrate, for example—which is soluble in both tungsten and copper or which reacts with these two materials. Elements or alloys of the ferrous metals group, such as nickel, are suitable for this purpose.

Suitable tungsten materials for the plasma-facing segment include monocrystalline tungsten, pure tungsten, AKS (aluminum-potassium-silicate doped) tungsten, UHP (ultra-high-purity) tungsten, nanocrystalline tungsten, amorphous tungsten, ODS (oxide-dispersion-strengthened) tungsten, W-Re, ODS-W-Re and carbide-, nitride-, or boride-precipitation-hardened tungsten alloys with preferred a carbide, nitride or boride concentration of between 0.05 and 1 vol. %. Segmentation of the tungsten/tungsten-alloy components is advantageous. As the crack propagation rate of the tungsten components is significantly higher in the direction of deformation than perpendicular to it, it may be advisable in the case of parts exposed to high levels of stress to produce the tungsten parts in such a way that the direction of deformation is perpendicular to the plasma-facing surface.

In order to achieve sufficient structural stability and rigidity, a component consisting of a metallic material with a strength of more than 300 MPa is bonded to the copper segment. Particularly suitable metallic materials include age-hardened Cu—Cr—Zr, and ODS-Cu materials as well as austenitic steels.

The selection of the most suitable bonding method depends upon the type of materials paired. Copper-copper or copper-steel pairings are best bonded using hard soldering or diffusion bonding techniques, such as hot isostatic pressing. Also suitable for copper-copper pairings are such melt-welding processes as high-energy electron-beam welding.

Other features which are considered as characteristic for the invention are set forth in the appended claims.

Although the invention is illustrated and described herein as embodied in a laminated component for fusion reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments and examples, when read in connection with the accompanying drawings.

BRIEF DESCRIPTION OF THE DRAWINGS

FIG. 1 is a perspective view of a diverter component produced as a flat-tile as described in Example 1;

FIG. 2 is a cross-section of the material sequence as described in Examples 1 and 2;

FIG. 3 is a perspective view of the mechanically processed intermediate product following back-casting, as described in Example 1;

FIG. 4 is a perspective view of a diverter component produced as a monoblock as described in Example 2; and FIG. 5 is a perspective view of a diverter component produced as a monoblock as described in Example 2 prior to bonding with the Cu—Cr—Zr tube

DETAILED DESCRIPTION OF THE PREFERRED EMBODIMENTS

EXAMPLE 1

A diverter plate 1 for fusion reactors was produced as a flat tile (see FIG. 1).

In the first step, tungsten tiles 2 measuring 20×40×6.5 mm were cut from a tungsten rod with a diameter of 60 mm. The tiles were cut from the rod in such a way that the tile height (6.5 mm) is parallel to the rod axis. Thus the particles are aligned in the direction of subsequent main heat flow. An intermediate tile 3 with a thickness of 2 mm, a width of 20 mm and a length of 40 mm was then cut from a plate consisting of a tungsten-copper composite with a copper concentration of 15% by weight (designation T 750).

In a suitable casting unit, a tungsten tile 2, an OHFC copper foil measuring 0.10 mm in thickness 6, the T 750 intermediate tile 3 and an OFHC-copper block 4 measuring 20×40×10 mm were stacked. The stack was then back-cast with OHFC copper in an inert-gas oven in a hydrogen atmosphere at a temperature of 1250° C. That temperature was maintained for 30 minutes, ensuring sufficient coverage of the molten copper on all of the solid components of the structure.

Following removal of the back-cast stack from the back-casting unit, the stack was milled on all sides. In the process, the back-cast copper was milled down to a residual thickness of 2 mm (see FIG. 3). In order to remove undesired copper deposits, the other surfaces were also milled on all sides.

Subsequent ultrasonic testing and a metallographic probe taken from a the joint zone of a parallel sample showed that a solid material bond was formed in the entire stack during the cooling phase once the temperature fell below the copper melting point.

Using the process described in the above-noted European patent specification EP 1 025 938, the laminated tiles produced in the back-casting process described above were joined with a Cu—Cr—Zr heat sink 5 in which the cooling structure 7 was worked in mechanically after removal from the HIP unit. The material sequence of the components is illustrated schematically in FIG. 2.

EXAMPLE 2

The diverter plate 1 shown in FIG. 4 was produced in monoblock design in a similar process.

A passage with a length of 10 mm and a diameter of 15.2 mm was bored through the center a block of tungsten 2 measuring 30×20×10 mm.

A ring 3 with an outside diameter of 15 mm, a wall thickness of 1 mm and a length of 10 mm was made from a plate consisting of a tungsten-copper composite with a copper concentration of 20% by weight (designation T 800).

An OHFC copper foil with a thickness of 0.1 mm, the ring 3 made from T 800 and a 15 mm long OFHC copper rod with a diameter of 13 mm were introduced into the passage bored through the tungsten block in accordance with the material sequence shown in FIG. 2. The tile bore was then back-cast with OFHC copper in an inert-gas oven in a hydrogen atmosphere at a temperature of 1250° C. for 30 min. After removal of the back-cast monoblock, a bore with a diameter of 12 mm concentric with the bore in the tungsten block was drilled into the back-cast copper. Upon completion of this processing phase, the laminated block exhibited an OFHC copper layer 4 with a thickness of 0.50 mm in the bore (see FIG. 5). The components produced in this way were joined with a Cu—Cr—Zr tube 5 with an outside diameter of 12 mm in an HIP process. The cooling structure 7 was introduced mechanically following removal from the HIP unit. Subsequent ultrasonic testing and metallographic analysis showed perfect bonding of the parts of the laminated component produced in this way.

This application claims the priority, under 35 U.S.C. § 119, of Austrian patent application AT/GM 228/2003, filed Apr. 2, 2003; the disclosure of the prior application is herewith incorporated by reference in its entirety.

We claim:

1. A highly heat-resistant composite component for a fusion reactor, comprising:
   a plasma-facing area made of tungsten or a tungsten alloy with a tungsten concentration of >90% by weight, a heat-dissipating area of copper or a copper alloy with a thermal conductivity of >250 W/mK and a mean grain size of >100 µm, and an area in between said plasma-facing area and said heat-dissipating area of a refractory-metal-copper composite;
   said refractory-metal-copper composite having a macroscopically uniform copper and refractory metal concentration progression and a refractory metal concentration x of 60 vol. %<x<90 vol. % throughout a thickness d of 0.1 mm<d<4 mm, and a refractory metal phase forming a virtually continuous skeleton.

2. The component according to claim 1, which comprises a part of a metallic material having a strength of >300 MPa at room temperature bonded to said heat-dissipating area made of copper or the copper alloy.

3. The component according to claim 2, wherein said part consists of a Cu—Cr—Zr alloy.

4. The component according to claim 2, wherein said component consists of an austenitic steel.

5. The component according to claim 1, wherein said area between said plasma-facing area and said heat-dissipating area consists of a refractory-metal-copper composite produced with a powder-metallurgical process.

6. The component according to claim 5, wherein said refractory-metal-copper composite consists of tungsten and 10 to 40 vol. % copper.

7. The component according to claim 5, wherein said refractory metal-copper composite consists of molybdenum and 10 to 40 vol. % copper.

8. The component according to claim 1, wherein said plasma-facing area is a segmented structure of tungsten or a tungsten-alloy.

9. The component according to claim 1 in the form of a flat tile.

10. The component according to claim 1 in the form of a monoblock.

11. A method for producing a highly heat-resistant laminated composite flat tile component, which comprises:
bonding one or more shaped parts of tungsten or tungsten alloy with one or more plate-shaped parts of a refractory metal-copper-composite and the plate-shaped parts with an area made of copper alloy in vacuum or a non-oxidative gas atmosphere by melting the copper-containing constituents and subsequently cooling to room temperature;
joining the shaped parts to an area made of copper or a copper alloy by melting the copper-containing constituents and subsequently cooling to room temperature;
mechanically processing the resulting component; and
subsequently bonding the mechanically processed component in a form-fit with a metal component having a strength of >300 MPa in a bonding process selected from the group consisting of welding, soldering, brazing, diffusion, and a plating process to thereby produce the highly heat-resistant composite component according to claim 1.

12. The method according to claim 11, which comprises bonding the shaped parts, plate-shaped parts, and the area of copper alloy in a temperature-resistant and corrosion-resistant form.

13. The method according to claim 12, wherein the temperature-resistant and corrosion-resistant form is a graphite form.

14. The method according to claim 11, which comprises introducing a foil of copper or copper alloy with a thickness of 0.005 to 0.5 mm between the shaped part of tungsten or tungsten alloy and the plate-shaped part of the refractory-metal-copper composite.

15. The method according to claim 14, which comprises applying a layer consisting of a ferrous metal in elemental or alloyed form to a bonding surface of one of the shaped part of tungsten or tungsten alloy, the plate-shaped part of the refractory-metal-copper composite, and the foil of copper or copper alloy.

16. The method according to claim 15, wherein the ferrous metal is nickel.

17. The method according to claim 11, which comprises applying a layer consisting of a ferrous metal in elemental or alloyed form to a bonding surface of one of the shaped part of tungsten or tungsten alloy and the plate-shaped part of the refractory-metal-copper composite.

18. The method according to claim 17, wherein the ferrous metal is nickel.

19. A method for producing a highly heat-resistant monoblock component, which comprises:
bonding one or more shaped parts of tungsten or a tungsten alloy and formed with bores to one or more ring-shaped parts of a refractory metal copper-composite and the ring-shaped parts to an area consisting of copper alloy in a vacuum or inert gas atmosphere by melting the copper-containing constituents and subsequently cooling to room temperature;
bonding to an area consisting of copper or a copper alloy by melting the copper-containing constituents and subsequently cooling to room temperature;
mechanically processing the resulting component;
subsequently bonding the mechanically processed component in a form-fit with a metal component having a strength of >300 MPa in a bonding process selected from the group consisting of welding, soldering, brazing, diffusion, and a plating process to thereby produce the highly heat-resistant composite component according to claim 1.

20. The method according to claim 19, which comprises bonding the shaped parts and plate-shaped parts in a temperature-resistant and corrosion-resistant form.

21. The method according to claim 20, wherein the temperature-resistant and corrosion-resistant form is a graphite form.

22. The method according to claim 19, which comprises introducing a foil of copper or copper alloy with a thickness of 0.005 to 0.5 mm between the shaped part of tungsten or tungsten alloy and the ring-shaped part of the refractory-metal-copper composite.

23. The method according to claim 22, which comprises applying a layer consisting of a ferrous metal in elemental or alloyed form to a bonding surface of one of the shaped part of tungsten or tungsten alloy, the ring-shaped part of the refractory-metal-copper composite, and the foil of copper or copper alloy.

24. The method according to claim 23, wherein the ferrous metal is nickel.

25. The method according to claim 19, which comprises applying a layer consisting of a ferrous metal in elemental or alloyed form to a bonding surface of one of the shaped part of tungsten or tungsten alloy and the ring-shaped part of the refractory-metal-copper composite.

26. The method according to claim 25, wherein the ferrous metal is nickel.

* * * * *